United States Patent
Kong et al.

(10) Patent No.: US 10,313,625 B2
(45) Date of Patent: Jun. 4, 2019

(54) METHOD, APPARATUS, AND STORAGE MEDIUM FOR VIDEO FILE PROCESSING

(71) Applicant: Lenovo (Beijing) Co., Ltd., Beijing (CN)

(72) Inventors: Wenhai Kong, Beijing (CN); Wei Liu, Beijing (CN); Jingxian Liu, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/941,444

(22) Filed: Mar. 30, 2018

(65) Prior Publication Data

US 2018/0288360 A1  Oct. 4, 2018

(30) Foreign Application Priority Data

Mar. 30, 2017 (CN) .......................... 2017 1 0205678

(51) Int. Cl.
*H04N 5/93* (2006.01)
*H04N 5/76* (2006.01)

(52) U.S. Cl.
CPC ..................................... *H04N 5/76* (2013.01)

(58) Field of Classification Search
CPC ..... H04N 21/44008; H04N 21/440218; H04N 21/440236; H04N 5/76
USPC ................................ 386/284, 286, 278, 326
See application file for complete search history.

(56) References Cited

U.S. PATENT DOCUMENTS

2012/0002236 A1\* 1/2012 Ebisui ................ G03G 15/5004
358/1.15

\* cited by examiner

*Primary Examiner* — Robert Chevalier
(74) *Attorney, Agent, or Firm* — Anova Law Group, PLLC

(57) ABSTRACT

Method, apparatus, and computer-readable storage medium for video file processing are provided. A video file is obtained, which includes a first save mode. The video file is detected to obtain a detection result. According to the corresponding detection result, at least one second save mode different from the first save mode is generated to save the video file.

20 Claims, 3 Drawing Sheets

METHOD, APPARATUS, AND STORAGE MEDIUM FOR VIDEO FILE PROCESSING

CROSS-REFERENCES TO RELATED APPLICATIONS

This application claims the priority of Chinese Patent Application No. 201710205678.7, filed on Mar. 30, 2017, the entire content of which is incorporated herein by reference.

FIELD OF THE DISCLOSURE

The present disclosure relates to the field of data processing technologies and, more particularly, relates to method, apparatus, and storage medium for video file processing.

BACKGROUND

Currently, video captured by a mobile phone can only be saved in a video file format. As a result, the best browsing manner of a video file cannot be offered. If a user wants to save the captured video in a better browsing manner, the operations need to be done manually. For instance, after a mobile phone takes a video, the video can only be saved in default format as a video file, and the system cannot provide additional save methods. In this case if the user wants to save the video as an animated graphic, the user has to achieve this by manual operations.

BRIEF SUMMARY OF THE DISCLOSURE

One aspect of the present disclosure provides a video file processing method. A video file may be obtained, and the video file may include a first save mode. The video file may be detected to obtain a detection result. The video file has a duration length less than a preset duration length. According to the detection result, at least one second save mode different from the first save mode may be generated to save the video file.

Another aspect of the present disclosure provides an apparatus for processing a video file. The apparatus may include a processor; and a memory coupled to the processor. The memory may store computer program instructions that, when executed by the processor, cause the processor to obtain a video file. The video file may include a first save mode. The processor may detect the video file to obtain a detection result. The processor may generate, according to the detection result, at least one second save mode different from the first save mode to save the video file.

Still another aspect of the present disclosure provides a computer-readable storage medium that is not a transitory signal. The computer-readable storage medium may store computer-executable instructions for execution by a hardware processor. The hardware processor may obtain a video file, and the video file may include a first save mode. The hardware processor may detect the video file to obtain a detection result, and the video file has a duration length less than a preset duration length. The hardware processor may generate, according to the detection result, at least one second save mode different from the first save mode to save the video file.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
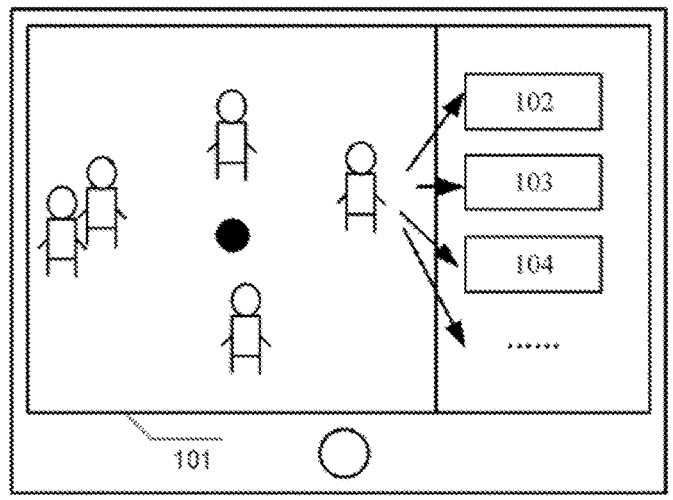
FIG. 1 is an application schematic diagram of a video file processing method and an apparatus implementing the method consistent with some embodiments of the present disclosure.

Reference will now be made in detail to exemplary embodiments of the present disclosure, which are illustrated in the accompanying drawings. Hereinafter, embodiments consistent with the disclosure will be described with reference to the drawings. Wherever possible, the same reference numbers will be used throughout the drawings to refer to the same or like parts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

It should be understood, however, that the descriptions are illustrative only and not intended to limit the scope of the disclosure. In addition, in the following, descriptions of the well-known structures and techniques are omitted, in order not to cause unnecessary confusion with the concept of the present disclosure.

The terminology herein is used for the purpose of describing particular embodiments only and not intended to limit the disclosure. The terms of "a", "an", "the" and the like, as used herein, should also include the meaning of "a plurality", and "a variety of", unless the context clearly dictates otherwise. Furthermore, the terms of "include", "comprise" and the like, as used herein, indicate the presence of stated features, steps, operations and/or components, but do not preclude the presence/addition of one or more other features, steps, operations, or components.

All terms (including technical and scientific terms), as used herein, have the meaning as commonly understood by one of ordinary skill in the art, unless otherwise defined. It should be noted that terms, as used herein, should be interpreted as having a meaning that is consistent with the context of the present description and should not be interpreted in an idealized or stereotypical manner.

Some block diagrams and/or flow charts are depicted in the drawings. It should be understood that certain blocks or a combination thereof in the block diagrams and/or flow charts may be realized by computer program instructions. These computer program instructions may be stored in a memory and provided to a processor of a computer or other programmable data processing apparatus such that the computer program instructions, when executed by the processor, cause the processor o perform functions and operations as defined in these block diagrams and/or flow charts.

Accordingly, the techniques of the present disclosure may be implemented in the form of hardware and/or software (including firmware, microcode, etc.). Additionally, the techniques of the present disclosure may take a form of a computer program product on a computer-readable storage medium which has stored instructions for use by or in connection with an instruction execution apparatus. In the context of the present disclosure, a computer-readable storage medium may include any medium that contains, stores, communicates, propagates, or transmits computer program instructions. For example, computer-readable storage media may include, but are not limited to, electrical, magnetic, optical, electromagnetic, infrared, and/or semiconductor apparatuses, devices, apparatuses, and/or transmitting media. Examples of the computer-readable storage medium include a magnetic storage device such as a magnetic tape or a hard disk (HDD), an optical storage device such as a compact disc (CD-ROM), a memory such as a random access memory (RAM) or a flash memory, and/or wired/wireless communication link.

Method, apparatus, and computer-readable storage medium for video file processing are disclosed, providing technical solutions to conventional technical problems that no additional save modes are automatically provided for a video file, e.g., captured by a mobile device. One aspect of the present disclosure provides a video file processing method. The method includes a video detection process and a save mode generation process. In the video detection process, a video file can be monitored during recording or detected after having been recorded. The purpose of monitoring and/or detecting is to determine, based on the video file, which save mode is more suitable for saving a captured video content. Once the detection of the video is completed, it may enter the save mode generation process. At this time, the apparatus can provide, according to a detection result of the video detection process, a better save mode.

FIG. 1 is an application schematic diagram of a video file processing method and an apparatus implementing the method consistent with some embodiments of the present disclosure.

As shown in FIG. 1, the method and the apparatus are mainly applicable to a short video shooting scene, and a video recording apparatus (which may include, but not limited to, a mobile phone, and a tablet computer) may provide a plurality of save modes. For example, if a mobile phone is applied to capture a short video (the default save mode is short video save mode), in order to provide users with the best browsing manner, after capturing a short video 101, multiple save modes may be provided for the user to make a selection, including, e.g. photo save mode 102, animated graphic save mode 103, compressed video save mode 104, and the like. In some embodiments, the provided save modes may be displayed on the video recording apparatus for easy selection.

Figure 2:
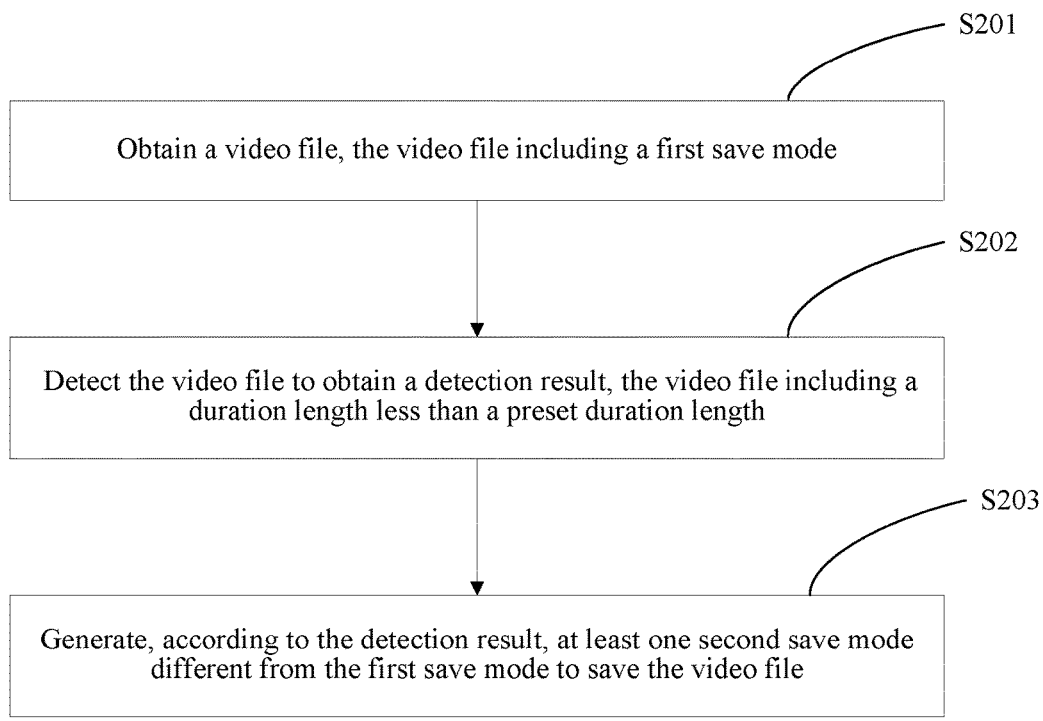
FIG. 2 illustrates a flow diagram of another video file processing method consistent with some embodiments of the present disclosure.

FIG. 2 illustrates a flow diagram of the video file processing method consistent with some embodiments of the present disclosure.

In S201: obtaining a video file, the video file including a first save mode.

In some embodiments, the video file may be a non-complete video file that is being recorded, or may be a complete video file that has been recorded. In addition, the video corresponding to the video file may be a short video. The short video file herein may refer to a duration length of a video that is less than a default duration length. The present disclosure will be described in detail below by using short videos as examples.

For a video file, the first save mode may be a default save mode, in a chase where the video file is saved in the default save mode regardless of the video content and other factors such as shorting foreground, shooting background, shooting subject, movement of the shooting subject, and change of the shooting background corresponding to the video content.

For example, for a clip of short video, the default save mode may include saving as a short video mode without considering the above described factors.

In S202: detecting the video file to obtain a detection result, the video file including a duration length less than a preset duration length.

In some embodiments, a manner of detecting the video file may include multiple variations, which is not limited herein. For example, for a video file, every frame of images of the video file may be obtained, and further each frame of images may be detected respectively. For example, each frame of image may be detected from the following aspects: shooting foreground, shooting background, shooting subject, movement of the shooting subject, change of the shooting background, and the like. For a video file, the detection result may include, but is not limited to, a detection result of each image frame, a comparison result between each image frame, and a detection result of all images as a whole, and the like.

In Step S203: generating, according to the detection result, at least one second save mode different from the first save mode to save the video file.

In some embodiments, the second save mode may include, for example, a photo save mode, an animated graphic save mode, an original data save mode, a compressed video save mode, and the like.

For example, in some embodiments, video data may be monitored during video recording, or may be detected after the video recording is completed to obtain a corresponding detection result. Based on the detection result, a video save mode corresponding to the shooting content may be automatically provided to the user.

Conventionally, after the video has been recorded, the system does not refer to any factor related to the shooting content, and instead, only provides a default save mode as preset. For example, for a short video, only a short video save mode is available. In that case, if the user wants to save a video as a non-default save mode, the user is required to do it manually. On one hand, it results in cumbersome save operations. On the other hand, a save mode as selected manually may not match the actual shooting content, and it may bring a poor browsing experience to the user.

As disclosed, unlike conventional technologies, a save mode that matches the shooting content can be automatically provided without requiring a manual operation, based on an automatic detection on the video file.

Figure 3:
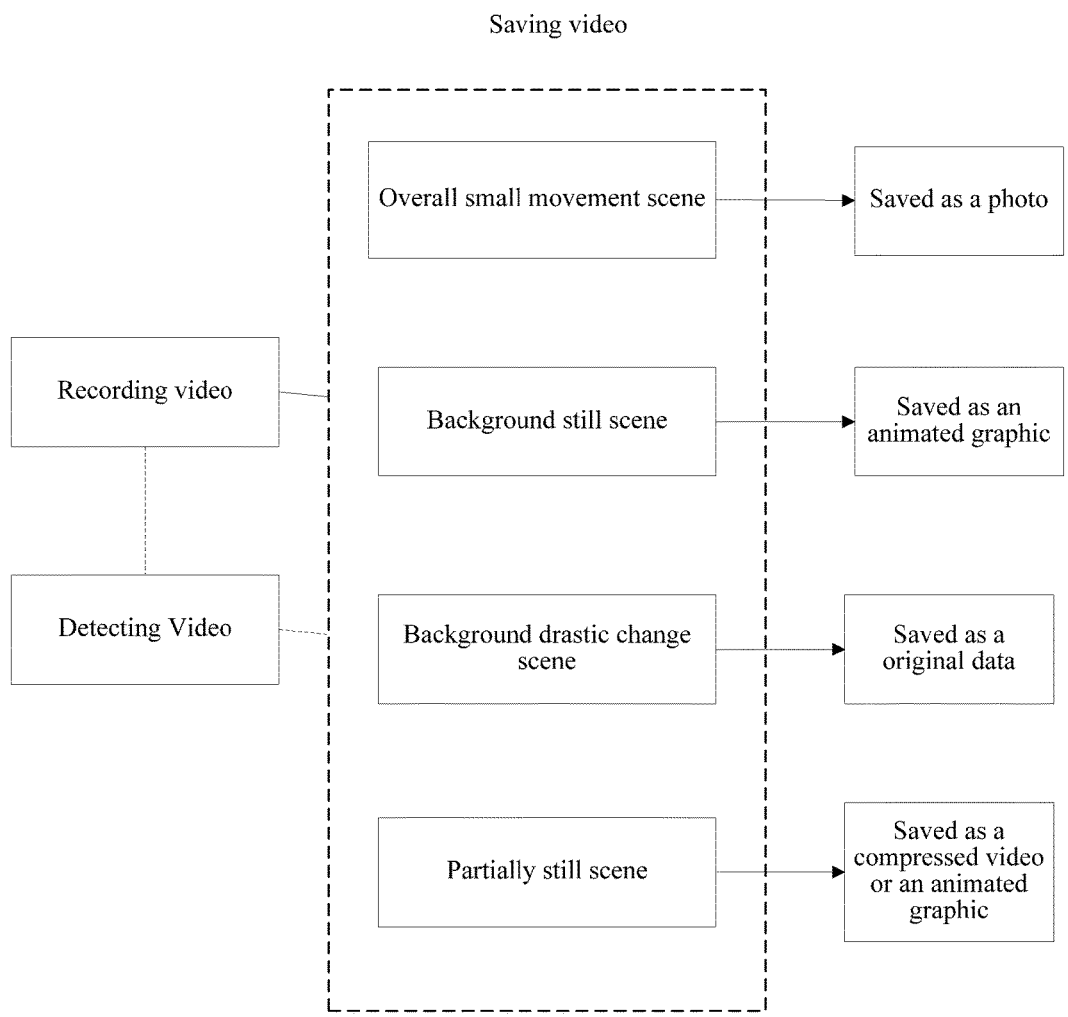
FIG. 3 is a schematic diagram illustrating another video file processing method consistent with some embodiments of the present disclosure.

FIG. 3 is a schematic diagram illustrating the video file processing method consistent with some embodiments of the present disclosure. With reference to FIG. 3, the method as shown in FIG. 2 will be further described accompanying with the embodiments in the following.

In some embodiments, after obtaining the video file, the above-disclosed method may further include: saving original data of the video file; obtaining an instruction of switching a save mode, the instruction of switching save mode instructing to re-save the video file saved in the second save mode to be in a third save mode; and re-saving, according to the instruction of switching the save mode, the video file in the third save mode.

The original data of the video file may be saved in a cloud server or locally.

In some embodiments, the third save mode may be a save mode different from the second save mode, which is not limited herein. After a short video is taken, the user may save it as a photo according to a save mode provided by the apparatus. In checking the saved photo, the user may realize that the saved result is poor. In that case, the user may go back to make his/her selection through the original data of the video file. That is, the save mode of the short video may be modified, as shown in FIG. 3, to an animated graphic, a compressed video or the like.

In some embodiments, by storing the original data of a video file, additional options may be offered for the user to modify an existing save mode, so as to bring more flexibility and diversity of saving video.

In some embodiments, generating, according to the detection result, the at least one second save mode different from the first save mode to save the video file may further include: determining, according to the detection result, whether a variation pattern of N consecutive image frames of the video file in a first area, such as a first preset area, matches a preset variation pattern, N being an integer greater than or equal to 2; and if a match is determined, saving the video file as a corresponding photo in a photo save mode; if a match is not determined, saving original data of the video file.

The first area, such as a first preset area, may include, but is not limited to, a shooting foreground, a shooting background, a shooting subject, and the like. In addition, in saving the video file in the photo save mode, an image frame of the best shooting quality (e.g., the clearest image) may be selected. Alternatively, the first image frame or the last image frame may be selected as a photo to be saved.

As the variation pattern matches a preset variation pattern, it may indicate that changes in the first area, such as the first preset area, of several adjacent image frames are smooth, and a variation range is not very drastic. In this case, by adopting the photo save mode, it can accordingly not only save a storage space, but also facilitate browsing through a photo summarizing the video file. As shown in FIG. 3, a short video may be saved as a photo of the best photo quality in an overall small movement scene.

In some embodiments, generating, according to the detection result, the at least one second save mode different from the first save mode to save the video file, may further include: determining, according to the detection result, whether a shooting background of M consecutive image frames of the video file is unchanged, M being an integer greater than or equal to 2; and if an unchanged shooting background is determined, saving the video file in an animated graphic save mode; if a change is determined, saving the video file as original data.

In a video, if the shooting background of M consecutive image frames is unchanged, the only difference exists in the shooting content, not the background. In that case, by saving the video file in the animated graphic save mode, it can not only save a storage space, but also bring a focus on a specific target when browsing the video file. As shown in FIG. 3, in a background still scene, a short video may be saved as a corresponding animated graphic (i.e., a dynamic photo).

In some embodiments, generating, according to the detection result, the at least one second save mode different from the first save mode to save the video file, may further include: determining, according to the detection result, whether a difference in a shooting background of K consecutive image frames of the video file exceeds a first preset range, K being an integer greater than or equal to 2; and if an exceeding is determined, saving the original data of the video file.

If the difference in the shooting background of K consecutive image frames of the video file exceeds the first preset range, it may indicate that the shooting background changes drastically. In that case, it is difficult to representatively describe the original video by a phone, an animated graphic, or a compressed video. Therefore, by saving the video file as the original data, it facilitates the user to browse the complete video content. As shown in FIG. 3, in a background drastic change scene, the short video can be saved in the original data.

In some embodiments, generating, according to the detection result, the at least one second save mode different from the first save mode to save the video file, may further include: determining, according to the detection result, whether a difference in a shooting scene of L consecutive image frames of the video file exceeds a second range, such as a second preset range, L being an integer greater than or equal to 2; and if the difference does not exceed the second preset range, compressing the video file; and saving the compress video file in a compressed video save mode; or saving the compressed video file as a corresponding moving image in an animated graphic save mode.

If the difference in the shooting scene of L consecutive image frames exceeds the second range, such as second preset range, it may indicate that a portion of the shooting scene is a still scene. In this case, the original video may be compressed to filter out the still scene, and further to save the compressed video file or save as the animated graphic. As such, it does not affect the user to get an idea of the video content, and further saves the storage space. As shown in FIG. 3, if the video shows a partially still scene, the short video may be compressed to save as the shorter video, or directly save as an animated graphic.

In some embodiments, the method may further include: detecting whether a function of manually saving the video file is activated before recording the video file; and if the function is not activated, obtaining the video fie and detecting the video file to generate the second save mode for saving the video file.

In some embodiments, in a manual save mode, the video may be saved based on the user's own selection. While in a non-manual save mode, an actual shooting content and related factors are taken into consideration to provide the save mode which matches the shooting content. In this way, the customized design meets the user's requirement.

Figure 4:
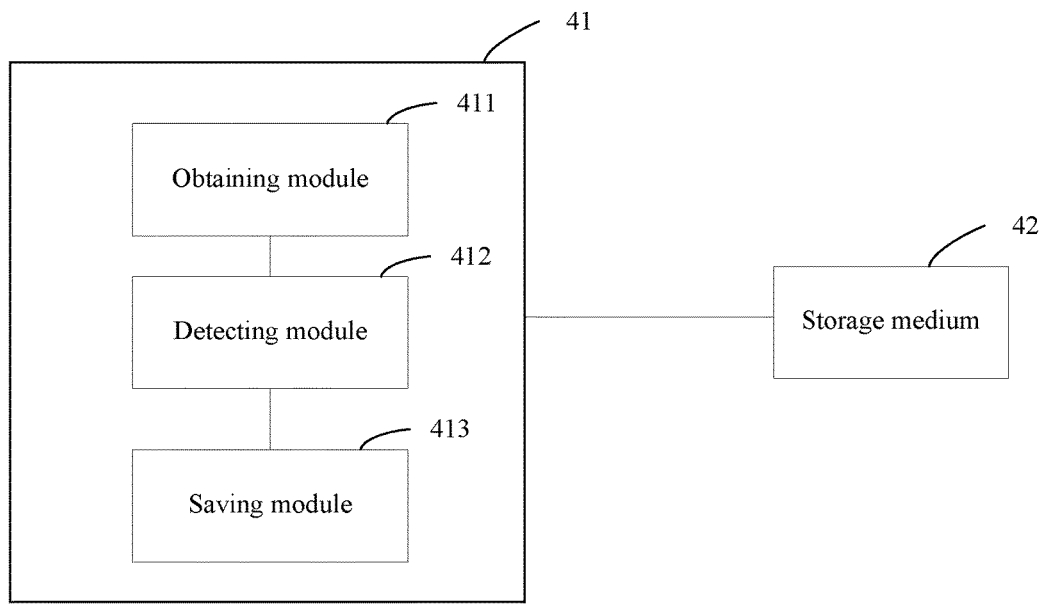
FIG. 4 is a schematic diagram of an apparatus implementing a video file processing method consistent with some embodiments of the present disclosure.

FIG. 4 is a schematic diagram of an apparatus implementing the video file processing method consistent with some embodiments of the present disclosure. As shown in FIG. 4, the apparatus may include a processor 41 and a storage medium 42 coupled to the processor 41 and storing computer instructions that, when executed by the processor 41, cause the processor 41 to perform the disclosed video file processing method. The processor 41 may include an obtaining module 411 configured to obtain a video file, the video file including a first save mode; a detecting module 412 configured to detect the video file to obtain a detection result; and a saving module 413 configured to generate, according to the detection result, at least one second save mode different from the first save mode to save the video file. In some embodiments, the video file may include a duration length less than a preset duration length.

The apparatus can execute the method described above with reference to FIGS. 2 and 3 to achieve a purpose of providing the best save mode of the currently captured video.

In some embodiments, a portion of the embodiments in a device aspect corresponds to a portion of the embodiments in a method aspect in an identical or similar manner. A portion of the modules or units in the device aspect corresponds to operations, realized function, an achieved goal, and solved problems in the method aspect in an identical or similar manner, and are not described herein again.

Conventionally, after the video is recorded, the apparatus does not refer to any factor related to shooting content, and only provides a default save mode. For example, for a short video file, only short video save mode is available. As such, if the user wants to save a video file as a non-default save mode, the operations should be done manually. On one hand, the save operations may be cumbersome. On the other hand, the manually selected save mode may not match the actual shooting content, resulting in a poor browsing quality.

However, the present disclosure provides a manner to automatically detect a video file, thereby automatically providing a save mode corresponding to the captured content without manual operations.

In some embodiments, as shown in FIG. 4, the saving module 413 may be configured to save the original data of the video file after obtaining the video file; the obtaining module 411 may be configured to obtain an instruction of switching save mode, the instruction of switching save mode instructing to re-save the video file saved in the second save mode to be in a third save mode; and the save module 413 may be further configured to re-save the video file in the third save mode according to the instruction of switching save mode.

In some embodiments, the saving module 413 may include a determining unit (not shown) configured to determine, according to the detection result, whether a variation pattern of N consecutive image frames of the video file in a first area, such as the first preset area, matches a preset variation pattern, N being an integer greater than or equal to 2. And the saving module 413, if a match is determined, may be configured to save the video file as a corresponding photo in a photo save mode.

In some embodiments, the determining unit may be further configured to determine, according to the detection result, whether a shooting background of M consecutive image frames of the video file is unchanged, M being an integer greater than or equal to 2. And the saving module 413, if no change is determined, may be configured to save the video file in an animated graphic save mode.

In some embodiments, the determining unit may be further configured to determine, according to the detection result, whether a difference in a shooting background of K consecutive image frames of video file exceeds a first preset range, K being an integer greater than or equal to 2. And the saving module 413, if an exceeding is determined, may be further configured to save original data of the video file.

In some embodiments, the determining unit may be further configured to determine, according to the detection result, whether a difference in a shooting scene of L consecutive image frames of the video file exceeds a second range, e.g., second preset range, L being an integer greater than or equal to 2. The processor may further include a compressing unit (not shown) configured to compress, if the difference does not exceed the second range, e.g., second preset range, the video file is compressed. And the saving module 413 may be further configured to save the compressed video file in a compressed video save mode, or save the compressed video file as a corresponding animated graphic in an animated graphic save mode.

Optionally, the detecting module 412 may be configured to detect whether a function of manually saving the video file is activated before recording the video file. And the processor 41 may further include a processing module (not shown). If the function is not activated, the processing module may be configured to obtain the video file and detect the video file to generate the second save mode for saving the video file.

The details of the device embodiments can be referred to FIGS. 2 and 3, and not be repeated herein.

In some embodiments, the obtaining module 411, the detecting module 412, saving module 413, the determining unit, and the processing module are named merely for functional description. These components may be combined in one module, or any of above-identified modules may be split into multiple modules. Alternatively, at least some functionality of one or more of these modules may be combined with at least some functionality of the other modules and implemented in one single module. In some embodiments, at least one of the obtaining module 411, the detecting module 412, the saving module 413 and other components may be at least partially implemented as a hardware circuit, e.g. a field programmable gate array (FPGA), a programmable logic array (PLA), an apparatus on chip, an apparatus on substrate, an apparatus on package, an application specific integrated circuit (ASIC), or any other appropriate manner that the circuit can be integrated or package in hardware. Alternatively, hardware, firmware, software can be integrated to realize the above-described method.

As shown in FIG. 4, another aspect of the present disclosure provides a storage medium 42 for storing computer-executable instructions that, when executed, perform the steps of the method as described above.

As shown, still another aspect of the present disclosure provides a processor 41 coupled to the storage medium 42 to execute the computer-executable instructions stored in the storage medium 42. When executed, the instructions perform the method as described above.

Figure 5:
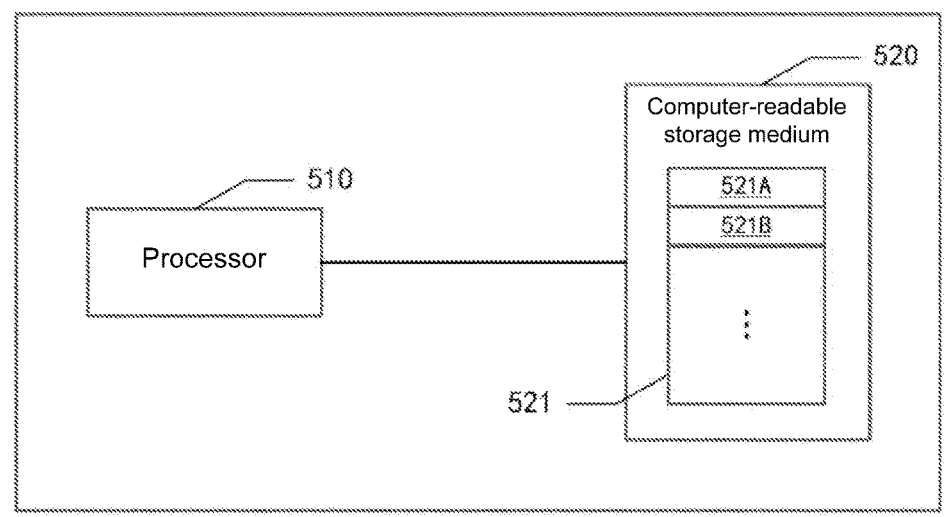
FIG. 5 is a schematic diagram of another apparatus implementing a video file processing method consistent with some embodiments of the present disclosure.

FIG. 5 is a schematic diagram of another apparatus implementing the video file processing method consistent with some embodiments of the present disclosure. As shown in FIG. 5, the apparatus of processing video file includes a processor 510, and a computer-readable storage medium 520 (e.g., that is not a transitory signal). The processor 510 and the computer-readable storage medium 520 constitute the processing apparatus to realize the goal to provide the best save manner based on the currently captured video.

The processor 510 may include, for example, a general-purpose microprocessor, an instruction set processor, an associated chipset, a special-purpose microprocessor, such as an application specific integrated circuit (ASIC), and the like. The processor 510 herein may include a single processing unit or a plurality of processing units for performing different operations of the method according to the embodiments of the present disclosure described with reference to FIGS. 2 and 3.

On the other hand, the computer-readable storage medium 510 may include any medium that can contain, store, communicate, propagate, or transmit instructions. For example, the computer-readable storage medium 510 may include, but not limited to, an electrical, magnetic, optical, electromagnetic, infrared, and/or semiconductor apparatus, device, or apparatus, and/or a transmitting medium. Examples may include: a magnetic storage device such as a magnetic tape or hard disk (HDD); an optical storage device such as a compact disk (CD-ROM); a memory such as a random access memory (RAM) or flash memory; and/or a wired or wireless communication links. Logic when implemented in software, can be written in an appropriate language, such as C# or C++, and can be stored on or transmitted through the computer-readable storage medium 520 (e.g., that is not a transitory signal), such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

The computer-readable storage medium 520 may include a computer program 521 including computer-executable instructions that, when executed by the processor 510, causes the processor 510 to perform the method as described above, referring to FIGS. 2 and 3, or any design variations based on the described method.

Computer program 521 may be configured with computer program codes including, for example, computer program modules. For example, in an example, the code in the computer program 521 may include one or more program modules including, for example, a module 521A, a module 521B and the like. It should be noted that the division manner and the number of the modules are not fixed, and those skilled in the art may apply appropriate program modules or combination of program modules according to actual situations. When these program module combinations, when executed by the processor 510, cause the processor 510 to perform the method flow as described above with reference to FIGS. 2 and 3, and its variations thereof.

In some embodiments, at least one of the obtaining module 411, the detecting module 412, and the saving module 413 may realize the computer program module, when executed by the processor 510, as shown in FIG. 5.

Although the present disclosure has been shown and described with reference to specific exemplary embodiments thereof, it will be understood by those skilled in the art that various modifications and changes in form and/or feature may be made without departing from the spirit and scope of the disclosure as defined by the appended claims as listed below. Other embodiments of the disclosure will be apparent to those skilled in the art from consideration of the specification and practice of the disclosure provided herein. It is intended that the specification and examples be considered as exemplary only, with a true scope and spirit of the disclosure being indicated by the claims.

What is claimed is:

1. A video file processing method, comprising:
   obtaining a video file, the video file including a first save mode;
   detecting the video file to obtain a detection result; and
   generating, according to the detection result, at least one second save mode different from the first save mode to save the video file.

2. The method according to claim 1, wherein, after obtaining the video file, the method further comprises:
   saving original data of the video file;
   obtaining an instruction of switching a save mode, the instruction of switching the save mode instructing to re-save the video file saved in the second save mode to be in a third save mode, and the third save mode being different from the second save mode; and
   re-saving, according to the instruction of switching the save mode, the video file in the third save mode.

3. The method according to claim 1, wherein generating, according to the detection result, the at least one second save mode different from the first save mode to save the video file, further comprises:
   determining, according to the detection result, whether a variation pattern of N consecutive image frames of the video file in a first area matches a preset variation pattern, N being an integer greater than or equal to 2; and
   if a match is determined, saving the video file as a corresponding photo in a photo save mode.

4. The method according to claim 1, wherein generating, according to the detection result, the at least one second save mode different from the first save mode to save the video file, further comprises:
   determining, according to the detection result, whether a shooting background of M consecutive image frames of the video file is unchanged, M being an integer greater than or equal to 2; and
   if an unchanged shooting background is determined, saving the video file in an animated graphic save mode.

5. The method according to claim 1, wherein generating, according to the detection result, the at least one second save mode different from the first save mode to save the video file, further comprises:
   determining, according to the detection result, whether a difference in a shooting background of K consecutive image frames of the video file exceeds a first range, K being an integer greater than or equal to 2; and
   if an exceeding is determined, saving original data of the video file.

6. The method according to claim 1, wherein generating, according to the detection result, the at least one second save mode different from the first save mode to save the video file, further comprises:
   determining, according to the detection result, whether a difference in a shooting scene of L consecutive image frames of the video file exceeds a second range, L being an integer greater than or equal to 2; and
   if the difference does not exceed the second range, compressing the video file; and
   saving the compressed video file in a compressed video save mode; or
   saving the compressed video file as a corresponding animated graphic in an animated graphic save mode.

7. The method of claim 1, further comprising:
   detecting whether a function of manually saving the video file is activated before recording the video file; and
   if the function is not activated, obtaining the video fie and detecting the video file to generate the second save mode for saving the video file.

8. The method according to claim 2, wherein saving the original data of the video file includes saving the original data of the video file in a cloud server or locally.

9. The method according to claim 3, wherein the first area includes at least one of a shooting foreground, a shooting background, or a shooting subject.

10. The method according to claim 1, wherein the detection result includes at least one of a detection result of each image frame, a comparison result between image frames, or a detection result of all images as a whole.

11. A video file processing apparatus, comprising:
    a processor; and a memory, coupled to the processor and storing computer program instructions that, when executed by the processor, cause the processor to:
obtain a video file, the video file including a first save mode;
detect the video file to obtain a detection result; and
generate, according to the detection result, at least one second save mode different from the first save mode to save the video file.

12. The apparatus according to claim 11, wherein, after obtaining the video file, the processor further:
saves original data of the video file;
obtains an instruction of switching a save mode, the instruction of switching the save mode instructing to re-save the video file saved in the second save mode to be in a third save mode, and the third save mode being different from the second save mode; and
re-saves, according to the instruction of switching the save mode, the video file in the third save mode.

13. The apparatus according to claim 11, wherein the processor further:
determines, according to the detection result, whether a variation pattern of N consecutive image frames of the video file in a first area matches a preset variation pattern, N being an integer greater than or equal to 2; and
if a match is determined, saves the video file as a corresponding photo in a photo save mode.

14. The apparatus according to claim 11, wherein the processor further:
determines, according to the detection result, whether a shooting background of M consecutive image frames of the video file is unchanged, M being an integer greater than or equal to than 2; and
if an unchanged shooting background is determined, saves the video file in an animated graphic save mode.

15. The apparatus according to claim 11, wherein the processor further:
determines, according to the detection result, whether a difference in a shooting background of K consecutive image frames of the video file exceeds a first preset range, K being an integer greater than or equal to 2; and
if an exceeding is determined, saves original data of the video file.

16. The apparatus according to claim 11, wherein the processor further:
determines, according to the detection result, whether a difference in a shooting scene of L consecutive image frames of the video file exceeds a second range, L being an integer greater than or equal to 2; and
if the difference does not exceed the second range, compresses the video file; and
saves the compressed video file in a compressed video save mode; or
saves the compressed video file as a corresponding animated graphic in an animated graphic save mode.

17. The apparatus according to claim 11, wherein the processor further:
detects whether a function of manually saving the video file is activated before recording the video file; and
if the function is not activated, obtains the video file and detects the video file to generate the second save mode for saving the video file.

18. A computer-readable storage medium that is not a transitory signal, the computer-readable storage medium storing computer-executable instructions for execution by a hardware processor to:
obtain a video file, the video file including a first save mode;
detect the video file to obtain a detection result; and
generate, according to the detection result, at least one second save mode different from the first save mode to save the video file.

19. The computer-readable storage medium according to claim 18, wherein the hardware processor further:
saves original data of the video file;
obtains an instruction of switching a save mode, the instruction of switching the save mode instructing to re-save the video file saved in the second save mode to be in a third save mode, and the third save mode being different from the second save mode; and
re-saves, according to the instruction of switching the save mode, the video file in the third save mode.

20. The computer-readable storage medium according to claim 18, wherein the hardware processor further:
determines, according to the detection result, whether a variation pattern of N consecutive image frames of the video file in a first area matches a preset variation pattern, N being an integer greater than or equal to 2; and
if a match is determined, saves the video file as a corresponding photo in a photo save mode.

* * * * *